UNITED STATES PATENT OFFICE.

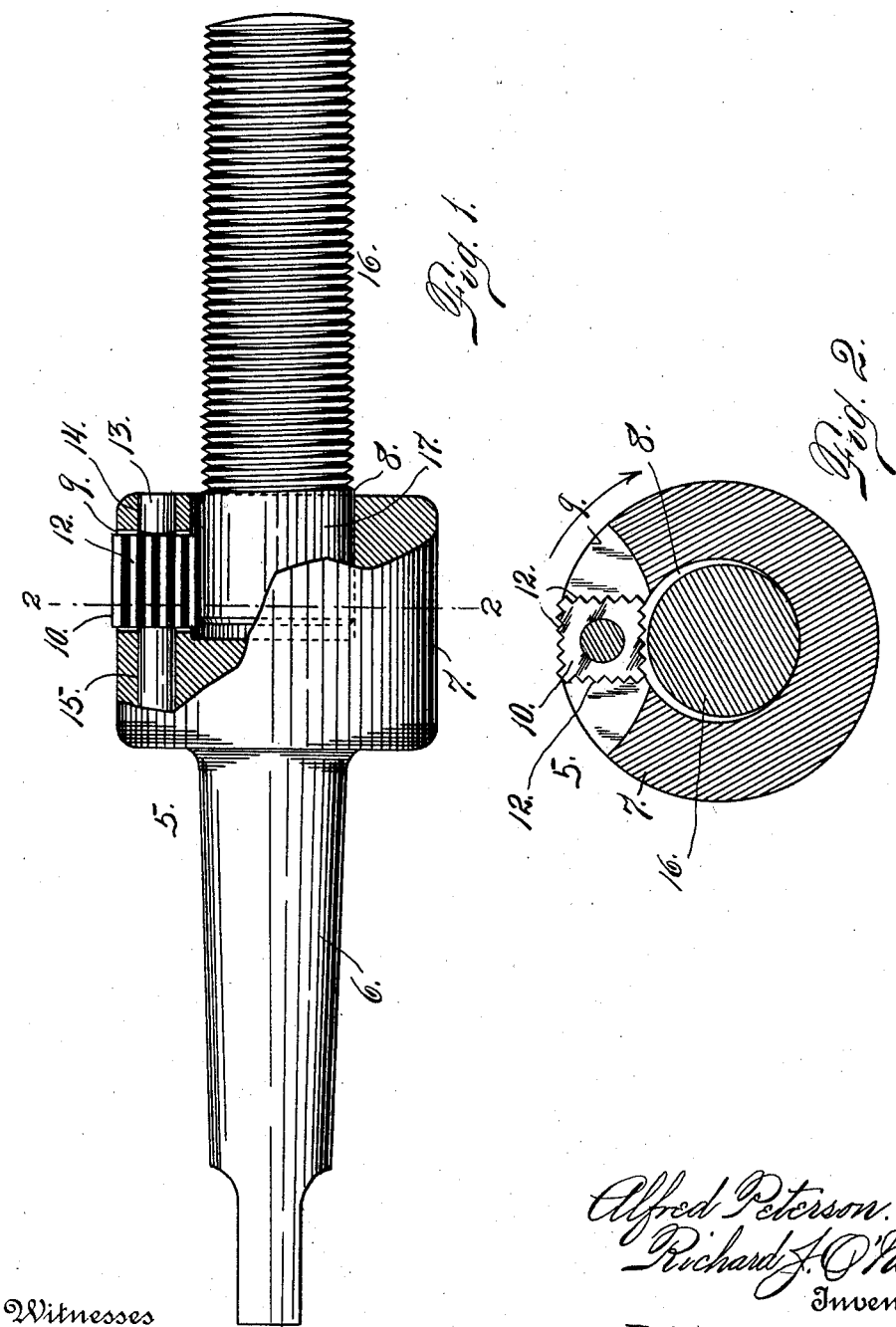

ALFRED PETERSON AND RICHARD J. O'NEILL, OF DENVER, COLORADO.

CHUCK.

1,003,369.

Specification of Letters Patent.　Patented Sept. 12, 1911.

Application filed February 27, 1911.　Serial No. 611,113.

*To all whom it may concern:*

Be it known that we, ALFRED PETERSON and RICHARD J. O'NEILL, citizens of the United States, residing in the city and county of Denver and State of Colorado, have invented certain new and useful Improvements in Chucks; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in rotary chucks, and consists essentially in mounting a rotary gripping device on the chuck so that it will automatically engage a bolt or other article to be gripped when the chuck is turned in either direction.

The object of the invention is to provide a chuck which is simple in construction and which may readily and quickly be applied to stay bolts or other devices to be rotated.

Another object of the invention is to provide a chuck which will be firm and positive in its gripping action upon the bolt or other article to be rotated.

Still another object of the invention is to provide a chuck which will firmly grip the article to be rotated when the chuck is turned in either direction.

As illustrated in the drawing, the invention embodies a chuck provided with an enlarged head which is recessed, the enlarged head being provided with an opening or aperture which communicates with the recess of the enlarged head and in which aperture a rectangular gripping device is rotatably mounted. This rotatable gripping device is provided with a number of gripping faces which protrude slightly into the enlarged head, whereby when the chuck is placed in position on a bolt and turned, the rotary gripping device is caused to turn in such a manner as to act as a cam in gripping the bolt or article to which it is applied. In other words, the more pressure or force there is applied to the chuck, the greater will be the gripping power or action of the said gripping device.

Having briefly outlined our improved construction, we will proceed to describe the same in detail, reference being made to the accompanying drawing in which is illustrated an embodiment thereof.

In this drawing: Figure 1 is an elevation partly in section of our improved chuck. Fig. 2 is a cross-section taken on the line 2—2 Fig. 1, viewed in the direction of the arrow.

The same reference characters indicate the same parts in all the views.

Let the numeral 5 designate a chuck having a shank 6 and an enlarged head 7. Within the head of this chuck is formed a recess or socket 8 adapted to receive the extremity of a bolt or other device to be rotated. On the side of this enlarged head is formed an aperture or recess 9, which recess or aperture extends entirely through the enlarged head and communicates with the recess 8.

Within the aperture or recess 9 is rotatably mounted a rectangular gripping device 10, provided with gripping teeth 12. This gripping device is rotatably mounted upon a pin 13 inserted into the wall of the enlarged head of the chuck, and intersecting the aperture 9. The forward extremity of the head 7 of the chuck is provided with an opening 14, while the rear part of the head is provided with a recess 15, the opening 14 and the recess 15 being on opposite sides of the aperture 9 and directly opposite each other, the opening 14 and the recess 15 being adapted to receive the opposite extremities of the pin 13.

The aperture 9 in the side of the head 7 of the chuck is enlarged outwardly in order to conform to the arc in which the gripping device 10 turns.

The operation of our improved chuck is as follows: It is assumed the shank 6 of the chuck is connected with a device or engine which imparts rotary motion thereto. When it is desired to apply or remove the stay bolt 16, it is only necessary to insert the plain extremity 17 of the bolt in the socket 8 of the chuck, in which event the rotary action of the head of the chuck will cause the teeth 12 of the rotary gripping device 10 to bite into the head of the bolt, and will quickly apply or remove the bolt. When the chuck is turned in the direction of the arrow in Fig. 2, the teeth 12 of the gripping device 10 will engage the head 17 of the bolt, and cause the gripping device to turn in the opposite direction to the direction of rotation of the chuck. The gripping device 10 acting as sort of a cam in gripping the article to which it is applied. This gripping action upon the bolt will be commensurate with the pressure or force that is applied to the chuck, thus making the chuck positive in action.

Having thus described our invention, what we claim is:

1. The combination with a chuck having an enlarged head, provided with a socket therein adapted to receive the head of a bolt or other article, the head of the chuck having an opening passing entirely through the side of the chuck and communicating with the socket, of a gripping device rotatably mounted within the said opening and projecting into the socket for gripping purposes, substantially as described.

2. The combination with a chuck having a head provided with a socket therein adapted to receive the head of a bolt or other article, the head of the chuck having an opening passing entirely through the side of the chuck and communicating with the socket, the opening in the side of the head being enlarged outwardly, of a rectangular gripping device provided with gripping teeth rotatably mounted within the said opening and projecting into the socket for gripping purposes, substantially as described.

3. The combination of a chuck having an enlarged head provided with a socket therein adapted to receive the head of a bolt or other article, the head of the chuck having an outwardly enlarged opening extending entirely through the side of the chuck and communicating with the socket, the opposite sides of the said opening being provided with registering apertures, a rotary gripping device inserted in the said opening on the side of the head, and a pin inserted into the registering apertures and passing through the rotary gripping device, for the purpose set forth.

In testimony whereof we affix our signatures in presence of two witnesses.

ALFRED PETERSON.
RICHARD J. O'NEILL.

Witnesses:
 JNO. G. POWELL,
 F. E. BOWEN.

---

Copies of this patent may be obtained for five cents each, by addressing the "Commissioner of Patents, Washington, D. C."